United States Patent
Yonemochi

(10) Patent No.: US 9,167,074 B2
(45) Date of Patent: Oct. 20, 2015

(54) MOBILE TERMINAL AND FUNCTION CONTROL METHOD THEREOF

(75) Inventor: Yasuhiro Yonemochi, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 1230 days.

(21) Appl. No.: 12/529,435

(22) PCT Filed: Mar. 6, 2008

(86) PCT No.: PCT/JP2008/054097
§ 371 (c)(1),
(2), (4) Date: Sep. 1, 2009

(87) PCT Pub. No.: WO2008/111493
PCT Pub. Date: Sep. 18, 2008

(65) Prior Publication Data
US 2010/0062804 A1    Mar. 11, 2010

(30) Foreign Application Priority Data
Mar. 13, 2007    (JP) .................................. 2007-064153

(51) Int. Cl.
| H04M 1/66 | (2006.01) |
| H04M 1/725 | (2006.01) |
| H04M 1/02 | (2006.01) |
| H04W 4/02 | (2009.01) |

(52) U.S. Cl.
CPC ........ *H04M 1/72577* (2013.01); *H04M 1/0245* (2013.01); *H04M 2250/12* (2013.01); *H04W 4/027* (2013.01)

(58) Field of Classification Search
CPC ...................... H04M 1/72522; H04M 1/72519
USPC ............ 455/556.1, 550.1, 411, 569.1, 575.3, 455/557; 709/220, 217, 8; 345/333.06; 248/346.06
See application file for complete search history.

(56) References Cited

U.S. PATENT DOCUMENTS

| 2004/0102211 A1 | 5/2004 | Ishida |
| 2004/0157647 A1* | 8/2004 | Takahashi ..................... 455/566 |

(Continued)

FOREIGN PATENT DOCUMENTS

| CN | 1503566 A | 6/2004 |
| EP | 1422912 A2 | 5/2004 |

(Continued)

OTHER PUBLICATIONS

Machine translation_Shuji_JP2004-015728A_pub. date_Jan. 15, 2004.pdf.*

(Continued)

*Primary Examiner* — Charles Appiah
*Assistant Examiner* — Alexander Yi

(57) ABSTRACT

The present invention provides a mobile terminal and a function control method thereof that can appropriately set or release an operation mode in accordance with a situation of a user. A mobile terminal includes an opening/closing sensor 18 that detects whether the mobile terminal is in an opened state or a closed state, an acceleration sensor 11 that detects acceleration and a posture of the mobile terminal, and a control unit 12 that restricts an execution of a specific function in accordance with the detection result of the opening/closing sensor 18 and releases a restriction of at least a portion of the restricted specific function in accordance with the detection result of the acceleration sensor 11.

7 Claims, 3 Drawing Sheets

(56) References Cited

U.S. PATENT DOCUMENTS

| | | |
|---|---|---|
| 2006/0284855 A1 | 12/2006 | Shintome |
| 2007/0259685 A1* | 11/2007 | Engblom et al. ............ 455/550.1 |
| 2008/0146289 A1* | 6/2008 | Korneluk et al. ........... 455/569.1 |
| 2010/0009667 A1* | 1/2010 | Hasegawa ..................... 455/418 |

FOREIGN PATENT DOCUMENTS

| | | |
|---|---|---|
| JP | 2002112349 A | 4/2002 |
| JP | 2003047062 A | 2/2003 |
| JP | 2004015728 A | 1/2004 |
| JP | 2006303701 A | 11/2006 |
| JP | 2006352765 A | 12/2006 |

OTHER PUBLICATIONS

Supplementary European Search Report for EP 08 72 1516 completed Dec. 14, 2011.

International Search Report for PCT/JP2008/054097 mailed May 27, 2008.

Chinese Office Action for CN200880008187.2 mailed on Nov. 2, 2012.

\* cited by examiner

F I G. 1
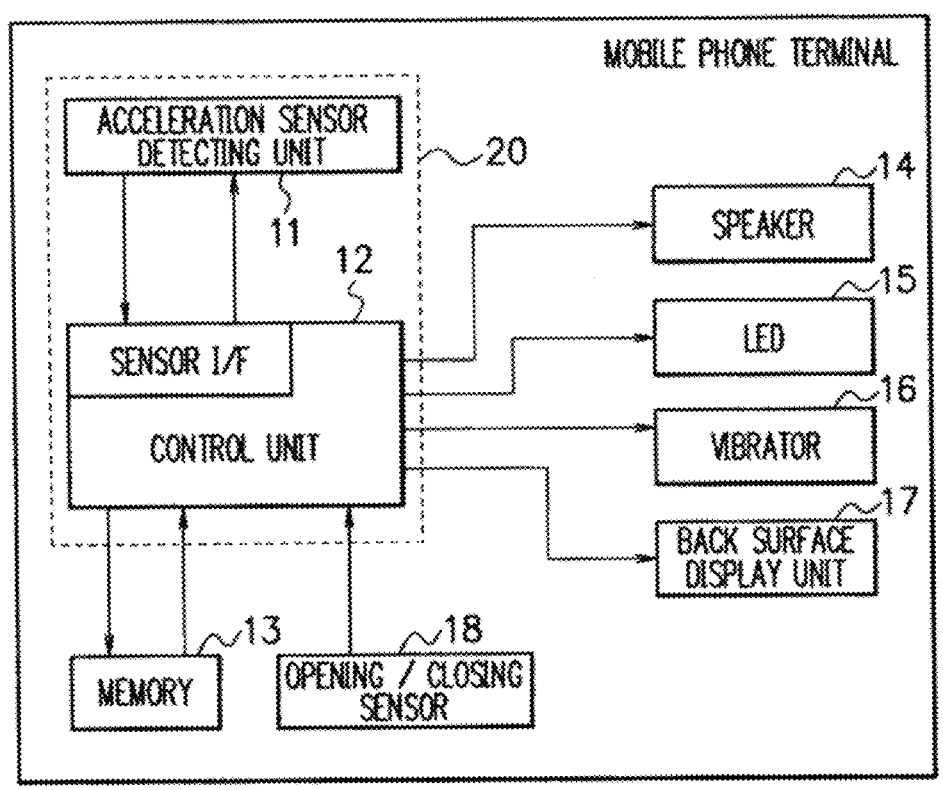

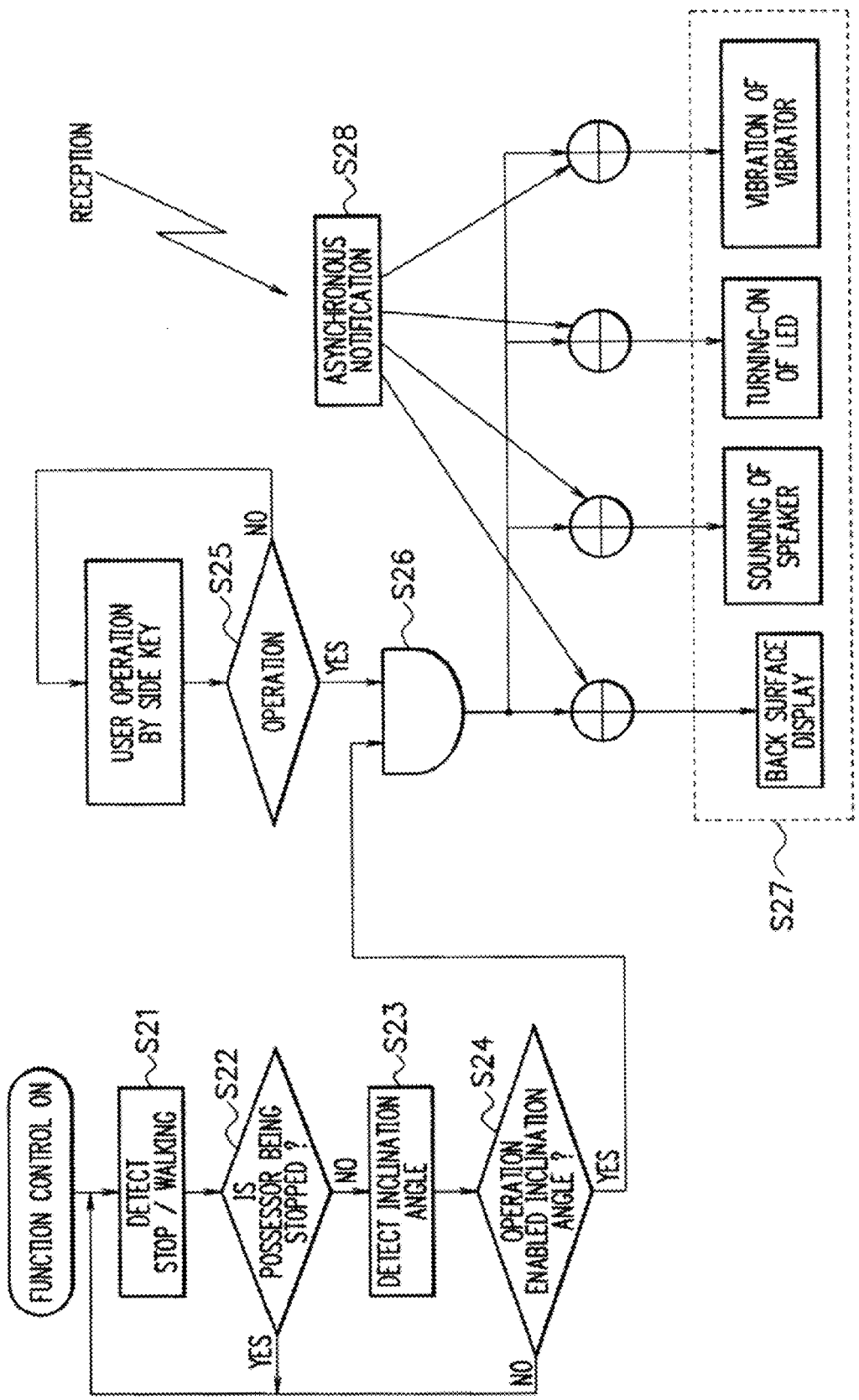

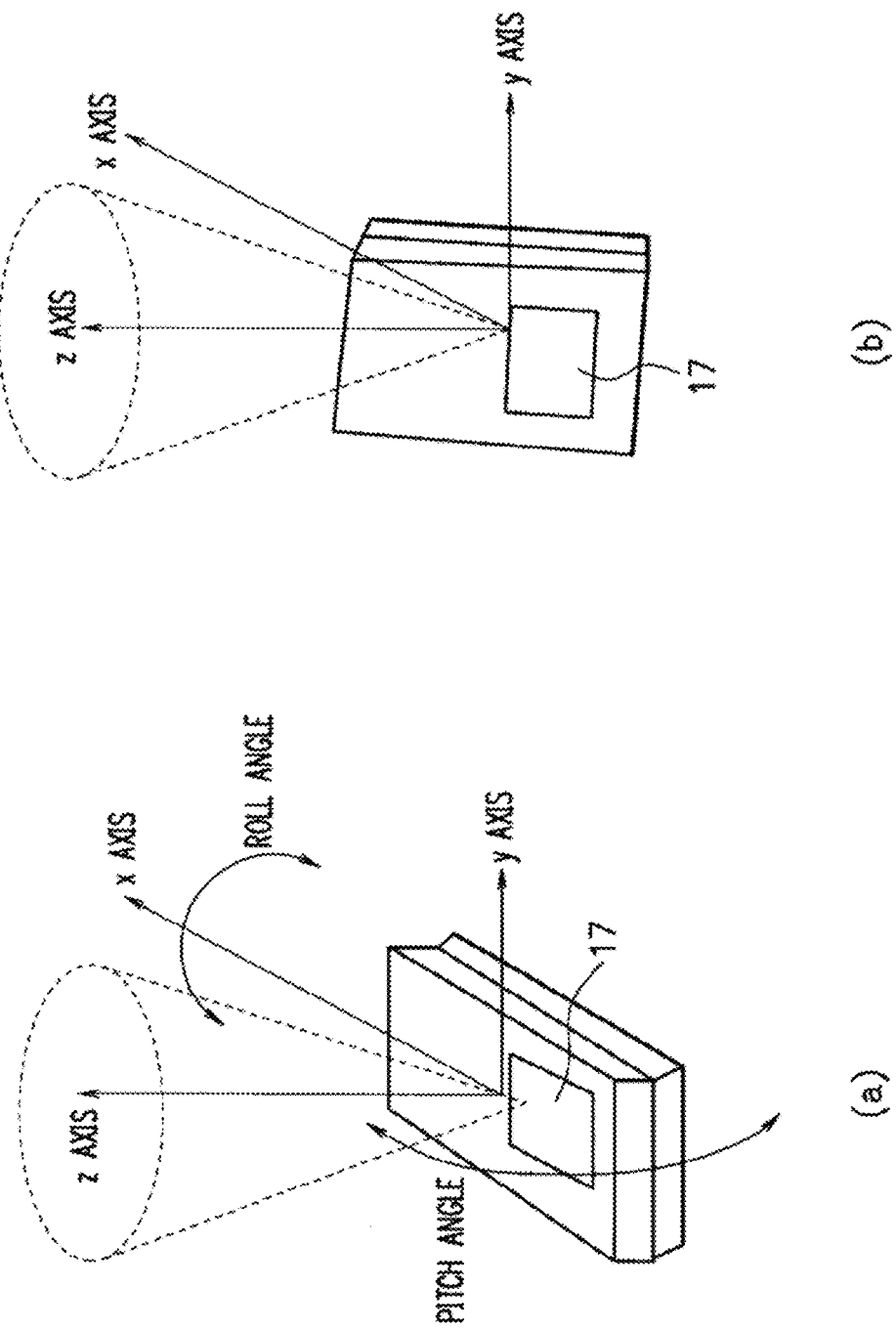

MOBILE TERMINAL AND FUNCTION CONTROL METHOD THEREOF

TECHNICAL FIELD

The present invention relates to a mobile terminal and a function control method thereof.

BACKGROUND ART

At the present time, foldable mobile phone terminals are generally used as mobile phone terminals. Among them, a plurality of mobile phone terminals mounts information display devices on their back surfaces. In these devices, clocks, reception of calls or mails, and other information telops are displayed.

Further, in addition to the information display in the back surface display devices, functions (camera function and the like) that can be used in a state where the terminal is closed exist.

In general, when a user is walking (traveling), the terminal is stored in a bag or a pocket of clothes. For this reason, a time for which the user actually operates the terminal is shorter than a time for which the user does not perform an operation in particular and the terminal does not need to be operated (so-called waiting time).

However, for the waiting time, information may need to be displayed on the back surface device. For this reason, the mobile phone terminal is generally configured, such that an operation is enabled using a side key or the like even in a closed state.

If the side key is pressed by other products that are stored in the bag or the pocket, an allocated function may start, and an operation state is maintained until the mobile phone terminal is taken out from the bag or the pocket. As a result, wasteful power consumption may be generated.

Further, when the user is walking, it is preferable that a function, which can be used in a state where the mobile phone terminal is closed, be not used, in terms of safety. However, in actuality, even in this situation, the mobile phone terminal is used, therefore, the utilization of the mobile phone terminal needs to be regulated. In general, these are categories of the self-responsibilities about the morals of the users. In recent years, however, protectors are demanded to restrict these functions, because children possess the mobile telephone terminal more and more.

In order to determine a situation of a user of a mobile phone terminal and automatically and appropriately set or release an operation mode, there is a "mobile phone terminal" that is, disclosed in Patent Document 1.

Patent Document 1: Japanese Patent Application Laid-Open No. 2003-47062

DISCLOSURE OF THE INVENTION

Problems to be Solved by the Invention

However, according to the invention that is disclosed in Patent Document 1, since a posture that the mobile phone terminal needs to be held is not considered, it is not possible to appropriately set or release an operation mode in accordance with a situation of a user.

Accordingly, the present invention has been made in view of the above-described problems, and it is an exemplary object of the present invention to provide a mobile terminal and a function control method thereof that can appropriately set or release an operation mode in accordance with a situation of a user.

Means for Solving the Problem

In order to achieve the exemplary object, as a first exemplary aspect, the present invention provides a mobile terminal that takes at least two forms of a utilization state and a non-utilization state, including: state detecting means for detecting whether the mobile terminal is in the non-utilization state; an acceleration sensor; posture detecting means for detecting a posture of the mobile terminal; restricting means for restricting an execution of a specific function in accordance with the detection result of the state detecting means; and restriction releasing means for releasing a restriction of at least a portion of the specific function restricted by the restricting means, in accordance with the detection results of the acceleration sensor and the posture detecting means.

In the first exemplary aspect of the present invention, the restriction releasing means preferably determines whether a possessor of the mobile terminal is moving in accordance with the detection result of the acceleration sensor, and determines whether the mobile terminal is held at an operation enabled posture in accordance with the detection result of the posture detecting means. When it is determined that the possessor of the mobile terminal is not moving and the mobile terminal is not held at the operation enabled posture, the restriction releasing means preferably releases the restriction of at least a portion of the specific function restricted by the restricting means. Further, the mobile terminal is preferably a mobile phone terminal that has a mobile communication function. Further, preferably, the acceleration sensor and the posture detecting means are integrally configured. Further, the specific function is preferably information display or reception of an operation through a user interface.

In order to achieve the exemplary object, as a second exemplary aspect, the present invention provides a function control method of a mobile terminal, including: a state detecting step of detecting whether the mobile terminal is in a utilization state or a non-utilization state; an acceleration detecting step of detecting acceleration applied to the mobile terminal; a posture detecting step of detecting a posture of the mobile terminal; a restricting step of restricting an execution of a specific function, in accordance with the detection result in the state detecting step; and a restriction releasing step of releasing a restriction of at least a portion of the specific function restricted in the restricting step, in accordance with the detection results in the acceleration detecting step and the posture detecting step.

In the second exemplary aspect of the present invention, in the restriction releasing step, preferably, it is determined whether a possessor of the mobile terminal is moving in accordance with the detection result in the acceleration detecting step, and it is determined whether the mobile terminal is held at an operation enabled posture in accordance with the detection result in the posture detecting step. When it is determined that the possessor of the mobile terminal is not moving and the mobile terminal is held at the operation enabled posture, the restriction of at least a portion of the specific function restricted in the restricting step is preferably released.

Effects of the Invention

According to the present invention, it is possible to provide a mobile phone terminal that can appropriately set or release an operation mode in accordance with a situation of a user.

BEST MODE FOR CARRYING OUT THE INVENTION

Acceleration sensors are used in a pedometer and can detect whether a possessor is in a stop state or a walking (traveling) state. Further, among the acceleration sensors, there is an acceleration sensor in which, in addition to detection of a movement, an inclination with respect to a gravity direction can be detected. In the following exemplary embodiment, the case of using an acceleration sensor capable of detecting an inclination with respect to a gravity direction will be exemplified.

Further, a mobile terminal is in a closed state, when the mobile terminal is in a common non-utilization state. If the acceleration sensor detects a walking (traveling) state, the acceleration sensor may not perform information display in a back surface display device or not receive an operation of a user. However, even in the closed state, since the case where the user desires to view information or perform an operation in the back surface display device is also assumed, an operation of only some user interfaces, such as side keys, is enabled, in consideration of an angle of when the user operates holding the mobile phone. Further, since it is difficult for the user to hold the terminal at a specific angle, a margin is set in an operation enabled angle.

The preferred exemplary embodiment of the present invention will be described. FIG. 1 shows the configuration of a mobile phone terminal according to the exemplary embodiment. The mobile phone terminal includes an acceleration sensor 11, a control unit 12, a memory 13, a speaker 14, an LED 15, a vibrator 16, a back surface display unit 17, and an opening/closing sensor 18. The acceleration sensor 11 can detect an inclination angle of the mobile phone terminal with respect to a vertical direction, in addition to the acceleration that is generated in the mobile phone terminal. The control unit 12 controls the individual units and detects a state of the acceleration sensor 11. A detecting unit 20 including the acceleration sensor 11 and the control unit 12 recognizes a situation (stop/walking (traveling)) of the possessor and stores recognized information in the memory 13. The control unit 12 detects an inclination angle of the acceleration sensor 11 and determines whether or not to perform an information notification.

When the information notification is performed, the speaker 14, the LED 15, the vibrator 16, and the back surface display unit 17 are used.

However, in an asynchronous notification from the outside (reception of a call and a mail), without depending on a state of the acceleration sensor 11, the notification may be made to the user through the speaker 14, the LED 15, the vibrator 16, and the back surface display unit 17.

An operation flow of the control unit 12 is shown in FIG. 2. This operation is executed by a software process of a computer (CPU) that constitutes the control unit 12.

When the mobile phone terminal is in an opened state (utilization state), it is considered that the user is using the mobile phone terminal. Therefore, when the opening/closing sensor 18 detects the opened state, the control unit 12 does not operate a function suppressing function.

If the function suppressing function becomes an ON state in the closed state (storage state) of the mobile phone terminal, the control unit 12 detects a state of the acceleration sensor 11 (Step S21), and determines whether the user is being stopped or moving (walking or traveling) (Step S22). When it is determined that the user is moving (Step S22/No), the control unit 12 detects an inclination angle using the acceleration sensor 11 (Step S23), and determines whether the inclination angle is an operation enabled inclination angle (Step S24). The "operation enabled inclination angle" will be described in detail below. When it is determined that the inclination angle is the operation enabled inclination angle (Step S24/Yes), the terminal state enters in a state of receiving the operation of the user. In this state, when the side key is operated by the user (Step S25/Yes), the control unit 12 receives the operation (Step S26), and performs at least one of display in the back surface display unit 17, sounding of the speaker 14, turning-on of the LED 15, and a vibration of the vibrator 16 (Step S27).

Further, when an asynchronous notification is made from the outside (Step S28), the control unit 12 takes a predetermined combination of the display in the back surface display unit 17, the sounding of the speaker 14, the turning-on of the LED 15, and the vibration of the vibrator 16, and displays a message indicating that the asynchronous notification is made (Step S27).

Here, the "operation enabled inclination angle" will be described using FIG. 3. As described above, the detection of the inclination angle is performed using the acceleration sensor 11. For the simplification of explanation, it is assumed that the acceleration sensor 11 is disposed at the center of the mobile phone terminal. FIG. 3A shows an example where a display surface of the back surface display unit 17 can be operated in a horizontal direction in a state where the mobile phone terminal is closed. Further, FIG. 3B shows an example where the display surface of the back surface display unit 17 can be operated in a vertical direction in a state where the mobile phone terminal is closed. In both the above examples, it is assumed that information displayed on the back surface display unit 17 is viewed when the user is in the stopped state. In the drawings, a conical shape that is shown by dotted lines shows a margin of an angle. When a vertical line is included in a conical portion, the control unit 12 validates an operation in a state where the mobile phone terminal is closed.

As such, when the mobile phone terminal according to the exemplary embodiment is stored in a bag or a pocket of clothes, the mobile phone terminal suppresses an unnecessary operation, thereby preventing wasteful power consumption. Since the function of the mobile phone terminal cannot be used during the walking of the user, it is possible to increase safety of the user.

Since the acceleration sensor that has a size mountable in the mobile phone terminal and is cheap is circulated, a manufacturing cost thereof does not greatly increase.

Further, the above exemplary embodiment is only an example of the preferred exemplary embodiment of the present invention, and the present invention is not limited thereto.

For example, the foldable mobile phone terminal is exemplified in the exemplary embodiment. However, as long as the mobile phone terminal that takes different forms at the time of utilization and at the time of non-utilization, the mobile phone terminal is not necessarily the folder mobile phone terminal, and the same effect can be obtained naturally even with a slidable mobile phone terminal.

Further, the mobile phone terminal does not necessarily have a function that performs communication through a mobile communication network, and the same effect can be obtained even in a mobile terminal, such as a PDA.

As such, in the present invention, various modifications can be made.

This application is the National Phase of PCT/JP2008/054097, filed Mar. 6, 2008, which is based upon and claims the benefit of priority from Japanese patent application No.

2007-064153, filed on Mar. 13, 2007, the disclosure of which is incorporated herein in its entirety by reference.

BRIEF DESCRIPTION OF THE DRAWINGS

FIG. 1 is a diagram illustrating the configuration of a mobile phone terminal according to a preferred exemplary embodiment of the present invention.

FIG. 2 is a flowchart illustrating an operation flow of a mobile phone terminal.

FIG. 3 is a diagram illustrating an example of an operation enabled inclination angle.

DESCRIPTION OF REFERENCE NUMERALS

11: acceleration sensor
12: control unit
13: memory
14: speaker
15: LED
16: vibrator
17: back surface display unit
20: detecting unit

The invention claimed is:

1. A wireless mobile terminal that takes at least two forms of a utilization state and a non-utilization state, comprising: a restricting unit that restricts an execution of a specific function when detecting a closed state and movement of the mobile terminal; a state detecting unit, having an acceleration sensor, that detects whether the mobile terminal is in the utilization state in accordance with the detection result of the acceleration sensor and determines whether a possessor of the mobile terminal is moving; a posture detecting unit that detects an inclination angle of the mobile terminal and determines whether the mobile terminal is held at an operation enabled posture based on a pre-set margin of an angle; and a restriction releasing unit that releases a restriction of at least a portion of the specific function restricted by the restricting unit when detecting an opened state of the mobile terminal, and releases a lesser portion of the specific function when detecting a closed state, in accordance with the detection results of the acceleration sensor and the posture detecting unit.

2. The mobile terminal according to claim 1, wherein the mobile terminal is a mobile phone terminal that has a mobile communication function.

3. The mobile terminal according to claim 1, wherein the acceleration sensor and the posture detecting unit are integrally configured.

4. The mobile terminal according to claim 1, wherein the specific function is information display.

5. The mobile terminal according to claim 1, wherein the specific function is reception of an operation through a user interface.

6. A method of a wireless mobile terminal, comprising: restricting an execution of a specific function when detecting a closed state and movement of the mobile terminal; detecting acceleration applied to the mobile terminal to determine whether a possessor of the mobile terminal is moving; detecting an inclination angle of the mobile terminal to determine whether the mobile terminal is held at an operation enable posture based on a pre-set margin of an angle; and releasing a restriction of at least a portion of the specific function when detecting an opened state of the mobile terminal, and releases a lesser portion of the specific function when detecting a closed state, in response to detecting the acceleration and detecting the inclination angle.

7. A wireless mobile terminal that takes at least two forms of a utilization state and a non-utilization state, comprising: restricting means for restricting an execution of a specific function when detecting a closed state and movement of the mobile terminal; state detecting means, having an acceleration sensor, for detecting whether the mobile terminal is in the utilization state in accordance with the detection result of the acceleration sensor and determining whether a possessor of the mobile terminal is moving; posture detecting means for detecting a posture of the mobile terminal and for detecting an inclination angle of the mobile terminal and determines whether the mobile terminal is held at an operation enabled posture based on a pre-set margin of an angle; and restriction releasing means for releasing a restriction of at least a portion of the specific function restricted by the restricting means when detecting an opened state of the mobile terminal, and releases a lesser portion of the specific function when detecting a closed state, in accordance with the detection results of the acceleration sensor and the posture detecting means.

* * * * *